UNITED STATES PATENT OFFICE.

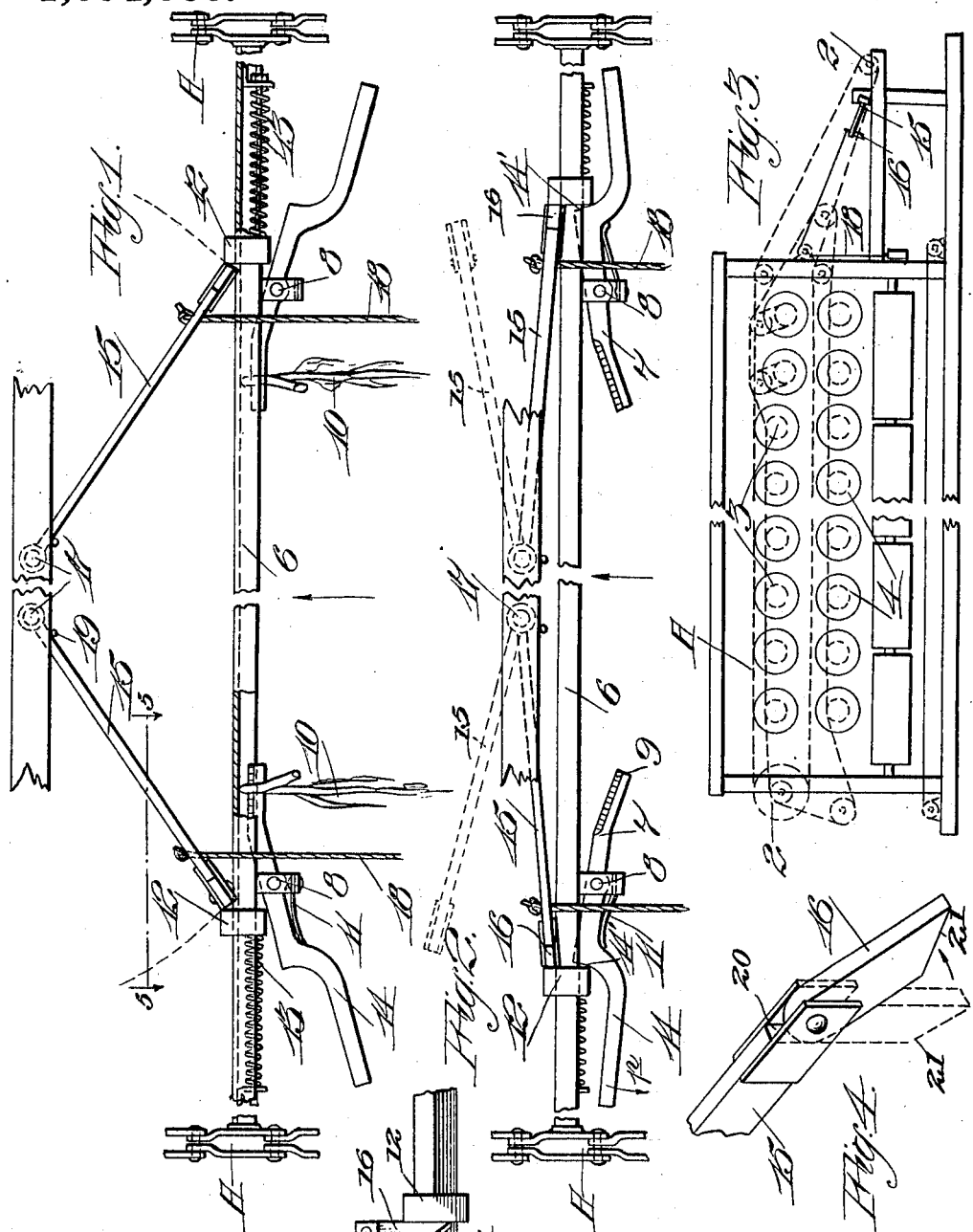

GEORGE E. MILLER, OF SACRAMENTO, CALIFORNIA, ASSIGNOR TO E. CLEMENS HORST COMPANY, OF SAN FRANCISCO, CALIFORNIA, A CORPORATION OF NEW JERSEY.

VINE-GRASPER.

1,054,360.

Specification of Letters Patent. Patented Feb. 25, 1913.

Application filed May 5, 1910. Serial No. 559,622.

*To all whom it may concern:*

Be it known that I, GEORGE E. MILLER, a citizen of the United States, residing at Sacramento, in the county of Sacramento and State of California, have invented new and useful Improvements in Vine-Graspers, of which the following is a specification.

My invention relates to an apparatus for grasping and holding a vine, like a hop vine, while the same is being drawn through a picking machine to remove the hops or other fruit from the vine.

The invention consists of the parts and the construction and combination of parts as hereinafter more fully described and claimed, having reference to the accompanying drawings, in which—

Figure 1 is a plan view in partial section of the grasper closed, and with the releasing device for the grasper in position for opening the jaws. Fig. 2 is a plan view of the grasper with the jaws open at the moment that the releasing device has about completed its work. Fig. 3 is an elevation of a hop-picking machine, showing the application of the invention. Fig. 4 is a detail of the free end of a releasing bar, showing the pivoted tongue, and Fig. 5 is a sectional elevation on the line 5—5 of Fig. 1, showing a fragment of the cross bar and the means of tripping the vine grasper.

While in the embodiment of the invention I have shown the same as particularly applied for use in a hop-picking machine where it has been put to practical operation, nevertheless it will be understood that it may be used elsewhere and in other machines, wherever it is desired to grip and hold a vine while its fruit or leaves are being stripped from it.

Having reference to the drawings, A represents a pair of endless chains or equivalent passing over suitable direction pulleys 2 and between upper and lower series of picking drums or fruit-stripping devices 3—4. The chains or carriers A are connected across at suitable intervals by the angle-iron bars 6, and pivoted to each of these bars and in the angle thereof and adjacent to each of the chains A, are two gripping members 7 fulcrumed at 8, and each having a triangular jaw portion 9 adapted to coact with the angle of bar 6 to grip and hold a vine, as 10. A spring 11 bears on the opposite or handle end of each gripper 7 normally to cause the jaws 9 to open outward from the angle-bar 6 and release the vine. A sliding collar 12 acted on by a spring 13 tends normally to press always inward toward pivot 8, and to slide underneath the handle portion of the gripper to cause the jaw to close on the angle-bar 6 and against the tension of the spring 11. The handle 14 of the gripper has a shouldered portion 14′ which passes into the angle and forms a stop to the collar 12 when the jaws are opened, as in Fig. 2. If the handle 14 is thrown in the direction of the arrow *p*, Fig. 2, collar 12 will fly in underneath the handle, as shown in Fig. 1, so that when the handle is released the collar will maintain the jaws 9 closed and gripped on the vine 10 against the action of spring 11.

In the machines in which these vine graspers are used, suitable means, as the hinged bars 15 having the depending fingers 16, are employed to shove back automatically the collars 12 and release the stripped vine. There is one of these bars 15 for each collar 12, and these bars are fulcrumed, at 17, to a fixed part of the machine, and are inclined outwardly. Their relative position in the machine is represented at the right of Fig. 3. These bars are hingedly supported inside the line of travel of the carrier chains A and of the grasper bars 6, and normally the hinged sections or fingers 16 depend into the path of a bar 6; the arms 15 being yieldingly held in operative position by suitable means, as the counterweighted cords or connections 18, and the inward movement of each arm 15 being limited by a stop 19. With the arms 15 in the position shown in Fig. 1, a finger 16 is encountered by an approaching grasper bar 6 just inside of the end of a collar 12. Since the fulcrum 17 of the arms 15 is fixed, and the bar 6 moves continuously, it is manifest that the bar 15 will move outward in an arc, represented by the dotted lines, causing the collar 12 to slide out and compress its spring 13 until it passes beyond the shoulder 14′ of handle 14, whereupon the vine is released, and spring 11 will then hold the gripper jaw 9 open until an operator manually closes it. Meanwhile the bar 6 moving forward against the downwardly projecting finger 16 (which latter is prevented from swinging inward by the stop afforded at 20, Fig. 4) will continue to push the arm 15 outward and turn it on its pivot 17 until the arm 15 is parallel, or nearly parallel, with rod 6, whereupon (as shown in Fig. 2) the inclined surface 21 of finger 16, coming in contact with the front edge of the grasper bar 6, will straighten out the finger, as shown in full lines, Fig. 4, releasing the arm 15 and allowing it to swing back into the position shown in Fig. 1, ready to intercept the next grasper bar 6 as it comes along, and open its gripper jaws 9 in a similar manner.

It will be understood that the device here shown is particularly designed and adapted for use on a hop picker of relatively enormous size. These machines are often sixty feet in length and proportionately large in their other dimensions. By reference to the partly diagrammatic view of Fig. 3 it will be seen that the conveyer chain passes over the pulleys at 2 and it is at this point that the vines are fed to the machine manually from the wagons or other means, whereby the unpicked hop vines are conveyed from the field.

In operation the grasper in the position of Fig. 2, passes around the pulleys 2 and the butt end of a vine is presented to the V-shaped opening between the angle bar and the jaw 9. A quick pull on the handle 14 then allows the collar 12 to slide behind the heel 14' and the vine is securely locked between the parts. In this way it is carried through the whole length of the machine and is finally released by mechanism heretofore described just prior to repassing over the pulley 2.

It will be seen that there is a particular advantage in the angular construction of the cross bar 6, and in the manner of mounting the said bar with relation to the jaws 9. In the construction shown the butt end of the vine is securely held against any possible chance of removal before the proper time. This is important as the vines are very heavy and if they become disengaged during their passage through the machine they are liable to cause breakage and delay operations.

Having thus described my invention, what I claim and desire to secure by Letters Patent is—

1. A vine grasper comprising, in combination, a conveyer element, a plurality of carriers associated with said conveyer element, normally open, pivotally mounted jaws on said carriers, spring-pressed collars mounted on said carriers, said collars coöperating with said pivotally mounted jaws and adapted to wedge the jaws securely against said carriers and a common means for retracting said collars on said carriers, whereby to allow said jaws to shift with relation to said collar, substantially as described.

2. A vine grasper comprising, in combination, a conveyer element, a plurality of carriers associated with said conveyer element, normally open, pivotally mounted jaws on said carriers, spring-pressed collars mounted on said carriers, said collars coöperating with said pivotally mounted jaws and adapted to wedge the jaws securely against said carriers, and a common means for retracting said collars on said carriers, said means including pivoted arms provided with pivoted fingers, substantially as described.

3. A vine grasper comprising, in combination, conveyer chains, a carrier member spanning said chains, a normally retracted grasper element pivotally mounted on said carrier, said grasper element having a jaw and a heel, a spring thrust collar mounted on said carrier and adapted when in one position to wedge said jaw against said carrier and in another position to be held against the heel of said grasper element, and automatic means for shifting said collar in order to permit said jaw to recede from said carrier, substantially as described.

4. The combination of an endless carrier comprising a pair of spaced parallel chains, an angle-bar connecting the chains, a hinged vine-grasping jaw member on the angle-bar and coöperating therewith, and a sliding part coöperating with the angle-bar and jaw member to hold the jaw closed.

5. The combination of an endless carrier comprising a pair of spaced parallel chains, an angle-bar connecting the chains, hinged vine-grasping jaw member on the angle-bar and coöperating therewith, a sliding part coöperating with the angle-bar and jaw member to hold the jaw closed, and means operative during the travel of the carrier automatically to actuate the sliding part to allow the jaws to open.

6. A vine grasper comprising an angle-bar mounted for travel in a direction transverse to its length, and means coöperating with a flange of said angle-bar to grasp a vine.

7. A vine grasper comprising an angle-bar mounted for travel in a direction transverse to its length, and means coöperating with a flange of said angle-bar to grasp a vine, said last-named means including a hinged jaw member operative in the opening of the angle-bar.

8. A vine grasper comprising an angle-bar mounted for travel in a direction transverse to its length, means coöperating with a flange of said angle-bar to grasp a vine, said last-named means including a hinged jaw member operative in the side opening of the angle-bar, said jaw member pivoted between its ends, and a lock operative between one end of the jaw member and angle-bar to hold the jaw closed.

9. A vine grasper comprising an angle-bar mounted for travel in a direction transverse to its length, means coöperating with a flange of said angle-bar to grasp a vine, said last-named means including a hinged jaw member operative in the side opening of the angle-bar, said jaw member pivoted between its ends, a lock operative between one end of the jaw member and angle-bar to hold the jaw closed, and means in the path of the lock automatically to release and allow said jaw member to open.

10. A vine grasper comprising an angle-bar mounted for travel in a direction transverse to its length, and means coöperating with a flange of said angle-bar to grasp a vine, said last-named means including a jaw member pivoted between its ends, with one end coöperating with the angle-bar as a clamp.

11. A vine grasper comprising an angle-bar mounted for travel in a direction transverse to its length, means coöperating with a flange of said angle-bar to grasp a vine, said last-named means including a jaw member pivoted between its ends, with one end coöperating with the angle-bar as a clamp, a spring acting to hold the jaw member normally open, and a sliding sleeve coöperating with the opposite end of the jaw member to hold the jaw closed.

12. A vine grasper comprising an angle-bar mounted for travel in a direction transverse to its length, means coöperating with a flange of said angle-bar to grasp a vine, said last-named means including a jaw member pivoted between its ends, with one end coöperating with the angle-bar as a clamp, a spring acting to hold the jaw member normally open, a sliding sleeve coöperating with the opposite end of the jaw member to hold end of the jaw member and angle-bar to hold the jaw closed, a stop on the jaw member operative to limit the movement of said sliding member when the jaw is opened, and a spring acting on said sliding member in opposition to said stop.

13. A vine grasper comprising an angle-bar mounted for travel in a direction transverse to its length, means coöperating with a flange of said angle-bar to grasp a vine, said last-named means including a jaw member pivoted between its ends, with one end coöperating with the angle-bar as a clamp, a spring acting to hold the jaw member normally open, a sliding sleeve coöperating with the opposite end of the jaw member to hold the jaw closed, a stop on the jaw member operative to limit the movement of said sliding member when the jaw is opened, a spring acting on said sliding member in opposition to said stop, and means in the path of the carrier automatically to open said jaw member.

In testimony whereof I have hereunto set my hand in the presence of two subscribing witnesses.

GEORGE E. MILLER.

Witnesses:
LESTER J. HINSDALE,
THEO. EDER.